United States Patent [19]

Bludssus et al.

[11] Patent Number: 5,209,910

[45] Date of Patent: May 11, 1993

[54] PROCESS FOR THE RECOVERY AND SEPARATION OF TANTALUM AND NIOBIUM

[75] Inventors: Walter Bludssus, Vienenburg; Joachim Eckert, Bad Harzburg, both of Fed. Rep. of Germany

[73] Assignee: Hermann C. Starck GmbH & Co. KG, Berlin, Fed. Rep. of Germany

[21] Appl. No.: 719,973

[22] Filed: Jun. 24, 1991

[30] Foreign Application Priority Data

Jul. 3, 1990 [DE] Fed. Rep. of Germany ....... 4021207

[51] Int. Cl.$^5$ ............... C22B 34/20; C01G 33/00; C01G 35/00
[52] U.S. Cl. ........................... 423/63; 423/62; 423/64; 423/65; 423/67; 423/68
[58] Field of Search ............... 423/62, 63, 64, 65, 423/67, 68; 75/10.35, 622

[56] References Cited

U.S. PATENT DOCUMENTS

| | | | |
|---|---|---|---|
| 2,962,372 | 11/1960 | Foos et al. | 423/63 |
| 3,117,833 | 1/1964 | Pierret | 423/63 |
| 3,712,939 | 3/1971 | Chapps et al. | 423/68 |
| 3,972,710 | 8/1976 | Meyer | 423/64 |
| 4,309,389 | 1/1982 | Meyer | 423/64 |

FOREIGN PATENT DOCUMENTS

| | | | |
|---|---|---|---|
| 603147 | 8/1960 | Canada | 423/64 |
| 658122 | 2/1963 | Canada | 423/64 |
| 62-292619 | 12/1987 | Japan | 423/64 |

*Primary Examiner*—Theodore Morris
*Assistant Examiner*—Edward Squillante
*Attorney, Agent, or Firm*—Jerry Cohen; Harvey Kaye

[57] ABSTRACT

Improved solvent extraction recovery of tantalum and niobium oxides from an acid solution of raw materials containing such oxides wherein the charged organic solvent [e.g., MIBK] is washed out (a) with 8–16N sulfuric acid and then (b) with water or dilute HF. This avoids the use of a second mineral acid addition after digestion by HF of raw materials (and avoids problems attendant to use a second mineral acid).

2 Claims, No Drawings

PROCESS FOR THE RECOVERY AND SEPARATION OF TANTALUM AND NIOBIUM

FIELD OF THE INVENTION

This invention relates to a process for the recovery of tantalum and niobium from raw materials containing them together, by digestion with pure hydrofluoric acid, separation of the two elements from unwanted accompanying elements and separation from one another by methyl isobutyl ketone (MIBK) solvent extraction of the tantalum- and niobium-fluoro complex compounds from the digestion solutions.

BACKGROUND OF THE INVENTION

According to U.S. Pat. 2,962,372, tantalum and niobium are extracted and separated by digestion of corresponding raw materials with hydrofluoric acid and acidification with sulfuric acid or hydrofluoric acid. Along with certain accompanying elements, the tantalum and niobium components dissolve to form complex heptafluorides $H_2TaF_7$ and $H_2NbF_7$ or $H_2NbOF_5$. After filtration from insoluble residue (alkaline earth fluorides, rare earth fluorides), the aqueous hydrofluoric or hydrofluoric-sulfuric acid solution containing tantalum and niobium is contacted with an organic extractant, such as for example methyl isobutyl ketone (MIBK), in a multistage mixer-settler plant.

The complex niobium and tantalum dissolve in the organic ketone phase and are extracted together while most of the impurities and accompanying elements, such as iron, manganese, titanium, etc. remain in the extraction raffinate. In practice a raw materials digestion solution throughout and extraction conditions are used so that concentrations of 150 to 200 g/l $Nb_2O_5$ + $Ta_2O_5$ are obtained in the organic phase. The niobium is re-extracted from the organic phase with water or dilute sulfuric acid. The aqueous phase takes up the complex niobium fluorides dissolved in the ketone, sulfuric acid and free hydrofluoric acid whereas the tantalum-fluoro compounds remain dissolved in the organic phase.

To remove traces of tantalum re-extracted with the niobium, the aqueous niobium solution is re-contacted with a small quantity of MIBK. This organic phase resulting is returned to the tantalum/niobium coextraction stage. The niobium oxide hydrate (niobium hydroxide) is precipitated by addition of gaseous ammonium or ammonia dissolved in water. After reextraction of the tantalum from the organic phase with water or dilute ammonia solution, tantalum may be precipitated as oxide hydrate with ammonia or, by addition of potassium salts, as $K_2TaF_7$, $K_2TaF_7$ is a starting material for the production of tantalum metal.

Considerable volume streams of heavily polluted waste-waters accumulate in the described process, including metal-salt-containing hydrofluoric acid/sulfuric acid solutions from the raffinate and the washing acid and highly dilute $NH_4F$ and/or $NH_4F/(NH_4)_2SO_4$ solutions from the precipitation processes. These waste waters have to be worked up, large quantities of gypsum/fluorspar sludges being formed in the process; these sludges have to be disposed of. Approximately 9 to 10 tons of sludge for disposal accumulate per ton of raw material/starting material.

In addition, the current purity requirements of >99.9% cannot be met by this process.

Accordingly, the object of the present invention is to provide a process which would not have the abovementioned disadvantages of the prior art.

SUMMARY OF THE INVENTION

This problem has been solved by the process according to the invention for the recovery of tantalum and niobium from raw materials containing them together by digestion with pure hydrofluoric acid, separation of the two elements from unwanted accompanying elements and separation from one another by methyl isobutyl ketone (MIBK) solvent extraction of the tantalum- and niobiumfluoro complex compounds from the digestion solutions, characterized in that (1) essentially no further mineral acid is added to the hydrofluoric acid/raw material digestion solution and (2) the loaded MIBK phase is separately washed out (2a) first with a dilute sulfuric acid and (2b) then with water or dilute hydrofluoric acid.

DETAILED DESCRIPTION OF THE PREFERRED EMBODIMENTS

The key feature of the process according to the invention is that tantalum and niobium are extracted from hydrofluoric acid solution without addition of a second mineral acid. The lower degree of extraction caused by the absence of a second mineral acid is compensated by increasing the throughput of organic (ketone) phase.

In addition, the loaded MIBK phase is washed first with dilute sulfuric acid and then with water. Only in this way can tantalum and niobium compounds be produced in a purity of >99.99%.

The tantalum and niobium containing MIBK phase is washed with a dilute sulfuric acid preferably having a normality of 8 to 16. In one particularly preferred embodiment of the process according to the invention, the contaminated dilute sulfuric acid is subsequently removed separately from the extraction process. To recover entrained tantalum/niobium, the $H_2SO_4$ removed may be recontacted with MIBK, The acid thus postpurified may be concentrated and reused as a commercial product. The contaminated dilute sulfuric acid is preferably used for recovering hydrofluoric acid by known solvent extraction processes, The resulting purified sulfuric acid can be recycled or transformed to a gypsum product. The recovering of hydrofluoric acid from the fluorine-containing raffinate is done by known processes, e.g. thermal treatment and pyrolysis of said fluorides.

It is also of advantage to deliver the fluorine-containing raffinate from the extraction of niobium and tantalum to the recovery of hydrogen fluoride.

Accordingly, the process according to the invention leads to pure fluorine-containing tantalum-niobium solutions from which pure $NH_4F$ solutions are obtained after precipitation of the oxides. This fluoride may readily be recovered as a useful product (for example $CaF_2$) by known methods.

The following Example is intended to illustrate the invention without limiting it in any way.

EXAMPLE

Solutions containing 90 g/l $Ta_2O_5$, 92 g/l $Nb_2O_5$, 315 g/l fluoride and 178 g/l sulfate were obtained by digestion of a typical tantalum/niobium raw material with aqueous hydrofluoride acid.

80 l/h of a tantalum niobium-containing digestion solution containing 90 g/l $Ta_2O_5$, 92 g/l $Nb_2O_5$ and 457 g/l fluoride were contacted with 130 l/h MIBK in a multistage mixer-settler plant with about 5 stages.

The resulting sulfuric-acid-free raffinate had the following composition: 215 g/l fluorine and <0.2 g/l combined oxide).

This raffinate was used for the recovery of HF by suitable methods known per se. The organic phase (MIBK phase) is then washed by diluted (12n) sulfuric acid. In contrast to the prior art, the washing acid (sulfuric acid) was separately removed for subsequent purification. Accordingly, it was not combined with the tantalum- and niobium-depleted aqueous phase and disposed of as hydrofluoric/sulfuric acid raffinate, as in the prior art. The tantalum/niobium ketone thus washed was re-contacted with pure water. Thereafter the aqueous phase is combined with the inflowing 12-normal sulfuric acid. A completely sulfate-free tantalum/niobium ketone was obtained in this way. A sulfate-free aqueous niobium fluoride solution (60 l/h) is obtained by selective stripping of the niobium with water (57 l/h), the niobium oxide hydrate being precipitated therefrom with ammonia by known methods. The fluorine-containing sulfuric acid (washing acid) separately removed was freed from HF by solvent extraction and the used as a useful product.

The filtrate from the precipitation of niobium hydroxide was neutralized with calcium oxide, 1.2 kg pure $CaF_2$ per kg valuable material being obtained as a useful product in addition to the $NH_3$ recovered.

The hydrofluoric acid raffinate was returned to an HF recovery plant where approximately 0.5 kg hydrofluoric acid (as HF) was recovered per kg combined oxides.

The metals dissolved in the raffinate, such as Fe, Ti, were removed in disposable form as oxides. Approximately 0.5 kg of a metal oxide mixture was obtained per kg combined oxides.

The mixed oxide recovered from the washed Ta/Nb ketone had the following composition:

| | | |
|---|---|---|
| Ta | [%] | 45.90 |
| Nb | [%] | 29.70 |
| As | [ppm] | 3 |
| Sb | [ppm] | 9 |
| Fe | [ppm] | 3 |
| P | [ppm] | 5 |

We claim:

1. In a process for the joint extraction of tantalum and niobium from raw materials containing both of these elements by digestion with pure hydrofluoric acid, said digestion forming solutions of complex fluoro compounds of tantalum and niobium, removal of accompanying substances which do not contain these two elements, and separation of the two elements by methyl isobutyl ketone (MIBK) solvent extraction of the tantalum fluoro and niobium fluoro complex compounds from the solutions containing tantalum and niobium and washing of the loaded MIBK phase with water or dilute sulfuric acid, the improvement wherein:

the loaded MIBK phase is washed in two separate steps first with dilute sulfuric acid, said dilute sulfuric acid picking up contaminants from said MIBK phase and then with a liquid selected from the class consisting of water and dilute hydrofluoric acid, the contaminant containing dilute sulfuric acid produced is discharged separately from the extraction process and separately processed, apart from the extraction process, for the recovery of hydrofluoric acid and gypsum from the sulfuric acid, and the fluorine-containing raffinate from the tantalum/niobium extraction is separately processed, apart from the extraction process for the recovery of hydrogen fluoride from the raffinate.

2. A process as claimed in claim 1, wherein the dilute sulfuric acid has a normality of 8 to 16.